(12) United States Patent
Wang et al.

(10) Patent No.: US 11,302,302 B2
(45) Date of Patent: Apr. 12, 2022

(54) METHOD, APPARATUS, DEVICE AND STORAGE MEDIUM FOR SWITCHING VOICE ROLE

(71) Applicant: Baidu Online Network Technology (Beijing) Co., Ltd., Beijing (CN)

(72) Inventors: Yu Wang, Beijing (CN); Bo Xie, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 341 days.

(21) Appl. No.: 16/038,861

(22) Filed: Jul. 18, 2018

(65) Prior Publication Data
US 2019/0027129 A1 Jan. 24, 2019

(30) Foreign Application Priority Data
Jul. 18, 2017 (CN) .......................... 201710585065.0

(51) Int. Cl.
*G10L 13/033* (2013.01)
*G10L 15/07* (2013.01)
(Continued)

(52) U.S. Cl.
CPC .......... *G10L 13/0335* (2013.01); *G06F 3/167* (2013.01); *G10L 15/07* (2013.01);
(Continued)

(58) Field of Classification Search
CPC ..... G10L 15/22; G10L 15/1815; G10L 15/26; G10L 15/28; G10L 15/063; G10L 15/16;
(Continued)

(56) References Cited

U.S. PATENT DOCUMENTS

| 2006/0122836 A1* | 6/2006 | Cross, Jr. ............. | H04M 3/493 704/260 |
| 2012/0005602 A1* | 1/2012 | Anttila .................. | G06F 3/0481 715/761 |

(Continued)

FOREIGN PATENT DOCUMENTS

| CN | 103236259 A | 8/2013 |
| CN | 105224278 A | 1/2016 |
| CN | 105709416 A | 6/2016 |

*Primary Examiner* — Yogeshkumar Patel
(74) *Attorney, Agent, or Firm* — von Briesen & Roper, s.c.

(57) ABSTRACT

Embodiments of the present disclosure disclose a method, apparatus, device, and storage medium for switching a voice role. The method includes: recognizing an instruction of switching a voice role input by a user, and determining a target voice role corresponding to the instruction of switching the voice role; switching a current voice role of a smart terminal to the target voice role, different voice roles having different role attributes, and a role attribute including a role utterance attribute; generating interactive response information corresponding to an interactive voice, based on the interactive voice input by the user and a role utterance attribute of the target voice role; and providing a response voice corresponding to the interactive response information to the user. The embodiments of the present disclosure enable different voice roles to have different role utterance attributes, so that the voice role has a role sense.

15 Claims, 4 Drawing Sheets

(51) Int. Cl.
  *G10L 15/22*   (2006.01)
  *G06F 3/16*    (2006.01)
  *G10L 13/04*   (2013.01)

(52) U.S. Cl.
  CPC .............. *G10L 15/22* (2013.01); *G10L 13/04* (2013.01); *G10L 2015/223* (2013.01)

(58) Field of Classification Search
  CPC ..... G10L 15/18; G10L 15/1822; G10L 15/19; G10L 15/30; G10L 15/00; G10L 15/183; G10L 2015/223; G10L 2015/088; G10L 2015/225; G10L 2015/228; G10L 2015/221; G10L 25/51; G10L 25/30; G10L 13/00; G10L 13/08; G10L 13/02; G10L 13/033; G10L 13/0335; G10L 13/04; G10L 13/043; G10L 13/047; G10L 13/10; G10L 17/22; G10L 15/07; G06F 3/167; G06F 40/30; G06F 16/3329; G06F 16/3343; G06F 3/165; H04M 2203/355; H04M 3/493; H04M 3/4936; H04M 1/271
  USPC .................. 704/E13.004, 235, 249, 257, 270
  See application file for complete search history.

(56) References Cited

U.S. PATENT DOCUMENTS

| | | | |
|---|---|---|---|
| 2012/0162540 A1* | 6/2012 | Ouchi | G10L 15/30 348/734 |
| 2014/0222436 A1* | 8/2014 | Binder | G06F 3/167 704/275 |
| 2015/0326719 A1 | 11/2015 | Daye et al. | |
| 2017/0358301 A1* | 12/2017 | Raitio | G10L 13/033 |
| 2018/0108343 A1* | 4/2018 | Stevans | G10L 15/26 |

\* cited by examiner

METHOD, APPARATUS, DEVICE AND STORAGE MEDIUM FOR SWITCHING VOICE ROLE

CROSS-REFERENCE TO RELATED APPLICATIONS

This application claims priority to Chinese Patent Application No. 201710585065.0, filed with the State Intellectual Property Office of the People's Republic of China (SIPO) on Jul. 18, 2017, the content of which is incorporated herein by reference in its entirety.

TECHNICAL FIELD

Embodiments of the present disclosure relate to the field of information processing technology, specifically to a method, apparatus, device, and storage medium for switching a voice role.

BACKGROUND

As the science and technology develop continuously, various smart devices such as smart robots and smart audios have come into being. A smart device needs to talk to a user with TTS (Text To Speech) of a virtual voice role (may also be referred to as a voice assistant.)

In the process of implementing the present disclosure, it is found that in the existing technology, the voice role of a smart device often appears as one role, and the one role can be presented to the user in only one style in order to maintain the uniformity of the style, such as a "female assistant" role. Thus undoubtedly the choices left to the user are slim, yet the user needs are often diverse: for example, children may like children's voices, men like women's voices, and women like men's voices.

In addition, even if the smart device can switch between voice roles, the result of the switching is only the change of the TTS voice, that is, an identical sentence is articulated by different persons, the change does not go deep into the personality and image of the virtual voice role itself. Therefore, it fails to truly realize the sense of the role. If the voice does not match the sense of the role, it will cause cognitive confusion and impede the user from having a sense of closeness and identity with the voice role, which will further affect the user's experience with the smart device.

SUMMARY

Embodiments of the present disclosure provide a method, apparatus, device, and storage medium for switching a voice role, to enhance the role sense of the voice role and meet people's growing personalized requirements for the voice role in a smart terminal.

In a first aspect, the embodiments of the present disclosure provide a method for switching a voice role, including:

recognizing an instruction of switching a voice role input by a user, and determining a target voice role corresponding to the instruction of switching the voice role;

switching a current voice role of a smart terminal to the target voice role, different voice roles having different role attributes, and a role attribute including a role utterance attribute;

generating interactive response information corresponding to an interactive voice, based on the interactive voice input by the user and a role utterance attribute of the target voice role; and providing a response voice corresponding to the interactive response information to the user.

In a second aspect, the embodiments of the present disclosure further provide an apparatus for switching a voice role, including:

a target voice role determination module, configured to recognize an instruction of switching a voice role input by a user, and determine a target voice role corresponding to the instruction of switching the voice role;

a switching module of a target voice role, configured to switch a current voice role of a smart terminal to the target voice role, different voice roles having different role attributes, and the role attribute including a role utterance attribute;

an interactive response information generation module, configured to generate interactive response information corresponding to an interactive voice, based on the interactive voice input by the user and a role utterance attribute of the target voice role; and a response voice providing module, configured to provide a response voice corresponding to the interactive response information to the user.

In a third aspect, the embodiments of the present disclosure further provide a computer device, including a memory, a processor, and a computer program stored on the memory and operable on the processor, the program, when executed by the processor, implements the method for switching a voice role according to any one of the embodiments of the present disclosure.

In a fourth aspect, the embodiments of the present disclosure further provide a computer readable storage medium, storing a computer program thereon, the program, when executed by a processor, implements the method for switching a voice role according to any one of the embodiments of the present disclosure.

The embodiments of the present disclosure provide a method, apparatus, device, and storage medium for switching a voice role. By determining a target voice role corresponding to the instruction of switching the voice role input by the user, switching a current voice role of a smart terminal to the target voice role, generating interactive response information corresponding to an interactive voice based on the interactive voice input by the user and a role utterance attribute of the target voice role, and providing a response voice corresponding to the interactive response information to the user, this technological means enables the different voice roles to have different role utterance attributes and consistent personalities, it enables the voice role to have a role sense, and the user can feel in the conversation that the voice role is a specific person with a personality.

DETAILED DESCRIPTION OF EMBODIMENTS

The present disclosure will be further described below in detail in combination with the accompanying drawings and the embodiments. It may be appreciated understood that the specific embodiments described herein are merely used for explaining the relevant disclosure, rather than limiting the disclosure. In addition, it should be noted that, for the ease of description, only the parts related to the relevant disclosure rather than the whole structure are shown in the accompanying drawings.

In addition, it should be noted that, for the ease of description, only the parts related to the relevant disclosure rather than all the contents are shown in the accompanying drawings. Before discussing the exemplary embodiments in more detail, it should be mentioned that some exemplary embodiments are described as a process or method depicted as a flowchart. Although the flowchart describes the operations (or steps) as a sequential process, many of these operations may be performed in parallel, concurrently, or simultaneously. In addition, the order of the operations may be rearranged. The process may be terminated when its operation is completed, but it may also have additional steps not included in the accompanying drawings. The process may correspond to methods, functions, procedures, subroutines, subprograms, and the like.

Embodiment One

Figure 1:
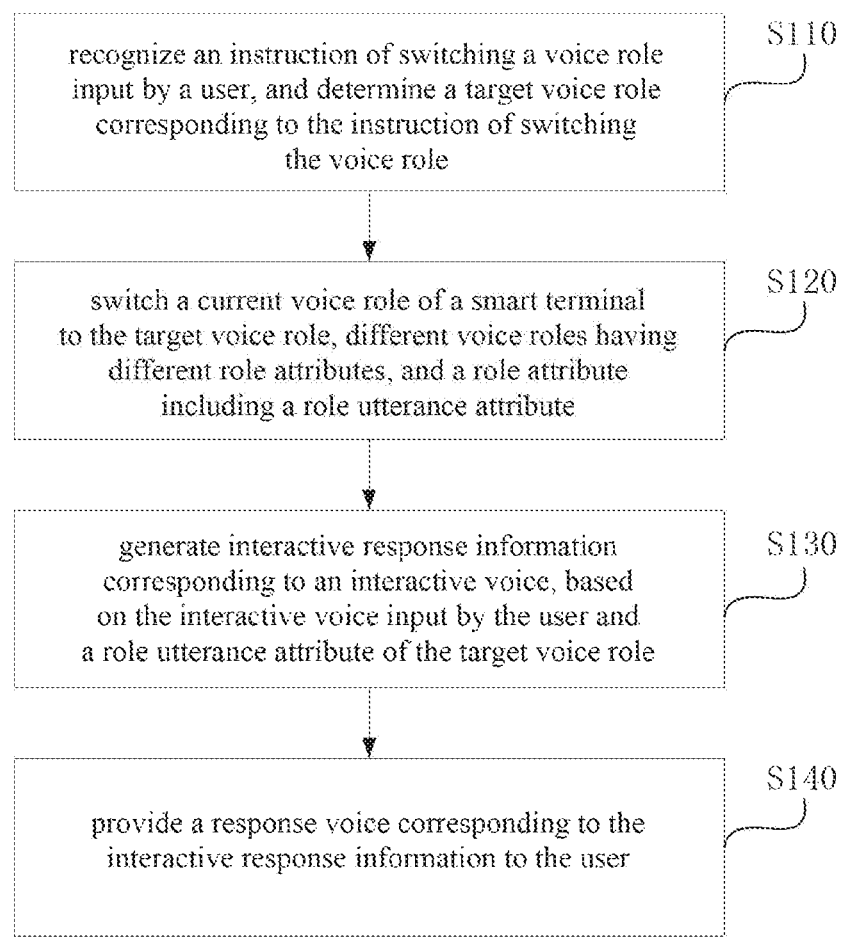
FIG. 1 is a flowchart of a method for switching a voice role according to Embodiment one of the present disclosure.

FIG. 1 is a flowchart of a method for switching a voice role provided by Embodiment one of the present disclosure. This embodiment may be applicable to a case of switching the voice role of a different role utterance attribute in a smart device based on an instruction of switching a voice role input by a user, and the method may be performed by an apparatus for switching a voice role provided by the embodiments of the present disclosure. The apparatus may be implemented by software and/or hardware, and may generally be integrated in various smart devices, such as smart robots or smart loudspeaker boxes. As shown in FIG. 1, the method in this embodiment specifically includes:

S110, recognizing an instruction of switching a voice role input by a user, and determining a target voice role corresponding to the instruction of switching the voice role.

In this embodiment, the smart device has built in at least two voice roles with different role senses, such as "girl next door", "smart Artificial Intelligence (AI)", and "wild kid". Different voice roles have different traits. For example: "girl next door" is tender and passionate, "smart AI" is reliable and calm and "wild kid" is innocent.

Here, the instruction of switching the voice role specifically refers to an instruction for switching to a different voice role. The instruction of switching a voice role may be an instruction sent by the user through an installed APP (application program) in a mobile terminal (for example, a mobile phone or a tablet computer) connected to the smart device, may also be an instruction sent by the user only through voice, or may be an instruction sent by the user by selecting a setting button or a setting touch area in the smart device. This embodiment does not have any limitation with this respect.

Alternatively, the instruction of switching the voice role may specifically be a voice control instruction. The reason for this setting is that the existing methods for switching or setting the voice role of a smart device need to rely on the APP installed in the mobile terminal, which requires establishing a communication connection between the mobile terminal and the smart device first. Therefore, when the network is poor, the switching of voice roles based on APP cannot be realized. However, if a voice-only instruction of switching the voice role is used, it may not rely on the control of the APP, so that the method for switching a voice role according to the embodiments of the present disclosure is more versatile.

In an alternative implementation of the present embodiment, the recognizing an instruction of switching a voice role input by a user, and determining a target voice role corresponding to the instruction of switching the voice role, may include:

defining, in response to a unique voice role being recognized based on the instruction of switching the voice role input by the user, the unique voice role as the target voice role; and selecting, in response to at least two candidate voice roles being recognized based on the instruction of switching the voice role input by the user, the target voice role from the at least two candidate voice roles using a setting filtering algorithm.

For example, if the instruction of switching the voice role input by the user is: "switch to girl next door," it may be uniquely determined that the target voice role is "girl next door." If the instruction of switching the voice role input by the user is "please change to another voice role" and the current voice role is "girl next door," it may be determined that the corresponding candidate voice roles are "smart AI" and "wild kid."

Here, the selecting the target voice role from the at least two candidate voice roles using a setting filtering algorithm may include: selecting the target voice role from the at least two candidate voice roles in a random selection method; or selecting a voice role having the highest historical frequency of use from the at least two candidate voice roles as the target voice role, and the like. This embodiment does not have any limitation with this respect.

S120, switching a current voice role of a smart terminal to the target voice role.

In this embodiment, different voice roles correspond to different role attributes. Here, the role attributes include role utterance attributes. The so-called role utterance attribute specifically refers to a linguistic expression that can be used to reflect a speaker's traits (or role sense) such as an utterance or a pet phrase of the voice role. The role utterance attribute may be reflected through multiple response templates.

By setting different role utterance attributes for different voice roles, the user can distinguish the traits between different voice roles more explicitly, thereby helping the user to establish a sense of closeness and identity with the voice role and greatly improve the user experience.

S130, generating interactive response information corresponding to an interactive voice, based on the interactive voice input by the user and a role utterance attribute of the target voice role.

The interactive voice input by the user may be a question input by the user or a simple chat content. The interactive response information specifically refers to response information fed back to the user by the voice role, in response to the interactive voice input by the user, for example, answer to the question input by the user, as well as a feedback content to the user's chat content.

To give a simple example: for an identical question (or interactive voice) input by the user, "what is the weather like in Beijing today," the voice role of the "girl next door" will answer: "the weather today is very nice in Beijing! It is a sunny day, and the highest temperature during the day is 31 degrees and the lowest temperature is 15 degrees at night. This weather is not bad for going out." The voice role of the "smart AI" will answer: "Beijing has a fine weather today, with a highest temperature of 31 degrees during the day and a lowest temperature of 15 degrees at night, and the weather is very nice." The voice role of the "wild kid" will answer: "Master, the weather is fine today in Beijing. It is a sunny day, and the highest temperature during the day is 31 degrees and the lowest temperature is 15 degrees at night. The weather is suitable for going out."

Typically, different response templates may be constructed for different voice roles, the constructed response template can reflect the traits of different voice roles. For different role voice attribute, different response templates are selected to generate interactive response information responding to the identical interactive voice input by the user, so that different voice roles may provide different interactive response information of different role senses.

Typically, the interactive voice input by the user may be acquired in an active state of the smart device, and corresponding interactive response information may be generated. In the sleep state of the smart device, an activating voice such as "XIAODU, XIAODU" input by the user is first recognized. After the above activating voice is recognized and the activation is successful, the interactive voice input by the user is acquired, and the corresponding interactive response information is generated.

S140, providing a response voice corresponding to the interactive response information to the user.

After acquiring the interactive response information in the form of text, the interactive response information may be further converted into a corresponding response voice to be provided to the user through TTS technology.

In addition to being reflected by the role utterance attribute, the role sense of a voice role may also be reflected by the role voice attribute.

Typically, the role voice attribute may include at least one of the following: a TTS voice library, a custom timbre, a custom speech rate, or a custom volume.

Correspondingly, the user may customize corresponding role voice attributes for different voice roles, or download pre-customized role voice attributes from the server.

Further, different voice roles may correspond to different role utterance attributes and role voice attributes, and the above parameters can constitute and support a voice role. Typically, role attributes corresponding to different voice roles may be stored in different storage spaces. When the user chooses to switch to a voice role, the corresponding role attributes of the voice role are loaded into the memory accordingly.

Alternatively, the providing a response voice corresponding to the interactive response information to the user, may include: providing the response voice corresponding to the interactive response information to the user, based on the role voice attribute of the target voice role.

The embodiments of the present disclosure provide a method for switching a voice role. By determining a target voice role corresponding to the instruction of switching the voice role input by the user, switching a current voice role of a smart terminal to the target voice role, generating interactive response information corresponding to an interactive voice, based on the interactive voice input by the user and a role utterance attribute of the target voice role, and providing a response voice corresponding to the interactive response information to the user, this technological means enables different voice roles to have different role utterance attributes and consistent personalities, it enables the voice role to have a role sense, and the user can feel in the conversation that the voice role is a specific person with a personality.

Embodiment Two

Figure 2:
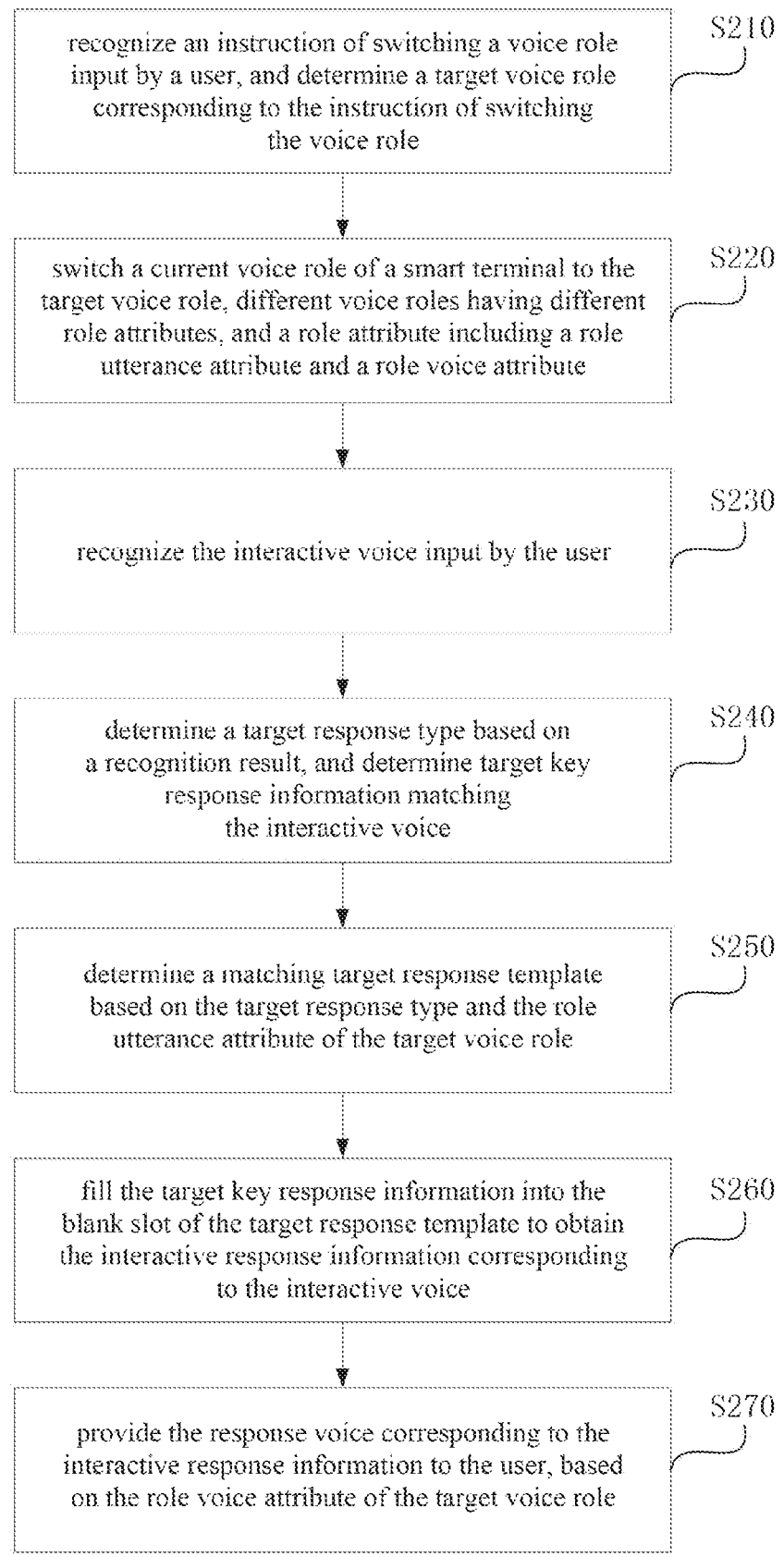
FIG. 2 is a flowchart of a method for switching a voice role according to Embodiment two of the present disclosure.

FIG. 2 is a flowchart of a method for switching a voice role provided by Embodiment two of the present disclosure. This embodiment is embodied based on the foregoing embodiment. In this embodiment, interactive response information corresponding to an interactive voice is generated based on the interactive voice input by the user and a role utterance attribute of the target voice role, specifically is: recognizing the interactive voice input by the user; determining a target response type based on a recognition result, and determining target key response information matching the interactive voice; determining a matching target response template based on the target response type and the role utterance attribute of the target voice role, wherein the target response template includes role sense background information and a blank slot for being filled with key response information; and filing the target key response information in the blank slot of the target response template to obtain the interactive response information corresponding to the interactive voice. Correspondingly, the method of this embodiment may include:

S210, recognizing an instruction of switching a voice role input by a user, and determining a target voice role corresponding to the instruction of switching the voice role.

S220, switching a current voice role of a smart terminal to the target voice role, wherein different voice roles have different role attributes, and the role attributes include role utterance attributes and role voice attributes.

S230, recognizing the interactive voice input by the user.

S240, determining a target response type based on a recognition result, and determining target key response information matching the interactive voice.

The response type may include a specific response type such as "play music," "weather query," "simple chat" or "gourmet search" for meeting different requirements of the user.

The key response information specifically refers to indispensable response information when feeding back to the interactive voice input by the user. For example, if the target response type determined based on the interactive voice input by the user is "weather query," the target key response information is the corresponding weather query result.

Typically, the interactive voice input by the user may be input into a pre-trained response type classification model to determine the corresponding target response type. The corresponding target response type may also be determined by performing keyword recognition on the interactive voice input by the user. For example, if the keyword "play" is recognized, the corresponding target response type is determined to be "play music," and if the keyword "weather" is recognized, the corresponding target response type is determined to be "weather query".

After the target response type corresponding to the interactive voice input by the user is determined, the target key response information that matches the interactive voice may be further determined. For example, if the interactive voice input by the user is: "What is the weather like in Beijing today?", then the target key response information is determined to be: "sunny, highest temperature 31 degrees, and lowest temperature 15 degrees."

S250, determining a matching target response template based on the target response type and the role utterance attribute of the target voice role.

The target response template includes role sense background information and a blank slot for being filled with key response information.

In a specific example, for different response types, different voice roles correspond to different role utterance attributes, and different role utterance attributes correspond to different response templates (where the same response type may correspond to one or more response templates in the same role utterance attribute.) For example, for the response type "weather query," when it is determined that the key response information includes "sunny," the response template for the voice role "girl next door" is: "the weather today is very nice in Beijing! It is a sunny day, XX during the day and XX at night. This weather is not bad for going out." The response template for the voice role "smart AI" is: "Beijing has a fine weather today, XX during the day and XX at night, and the weather is very nice." The response template for the voice role "wild kid" is: "Master, the weather is fine today in Beijing. It is a sunny day, XX during the day and XX at night. The weather is suitable for going out." Here, "XX" represents a blank slot for being filled with the key response information.

Of course, it may be understood that, for the "weather query" response type, when it is determined that the key response information includes "sunny," the role utterance attributes of different voice roles may also have other types of response templates. This embodiment does not have any limitation with this respect.

S260, filing the target key response information in the blank slot of the target response template to obtain the interactive response information corresponding to the interactive voice.

S270, providing the response voice corresponding to the interactive response information to the user, based on the role voice attribute of the target voice role.

By designing response templates of different role utterance attributes for different voice roles, the technical solution of the embodiments of the present disclosure may provide response voices of different role senses for the same interactive voice input by the user. It may solve the problem that in the existing technology, when switching the voice role, only that an identical sentence is articulated by different persons, the change does not go deep into the personality and image of the virtual voice role itself, thus failing to truly realize the sense of the role. The technical solution greatly improves the user experience and the interactivity of smart device.

Embodiment Three

Figure 3:
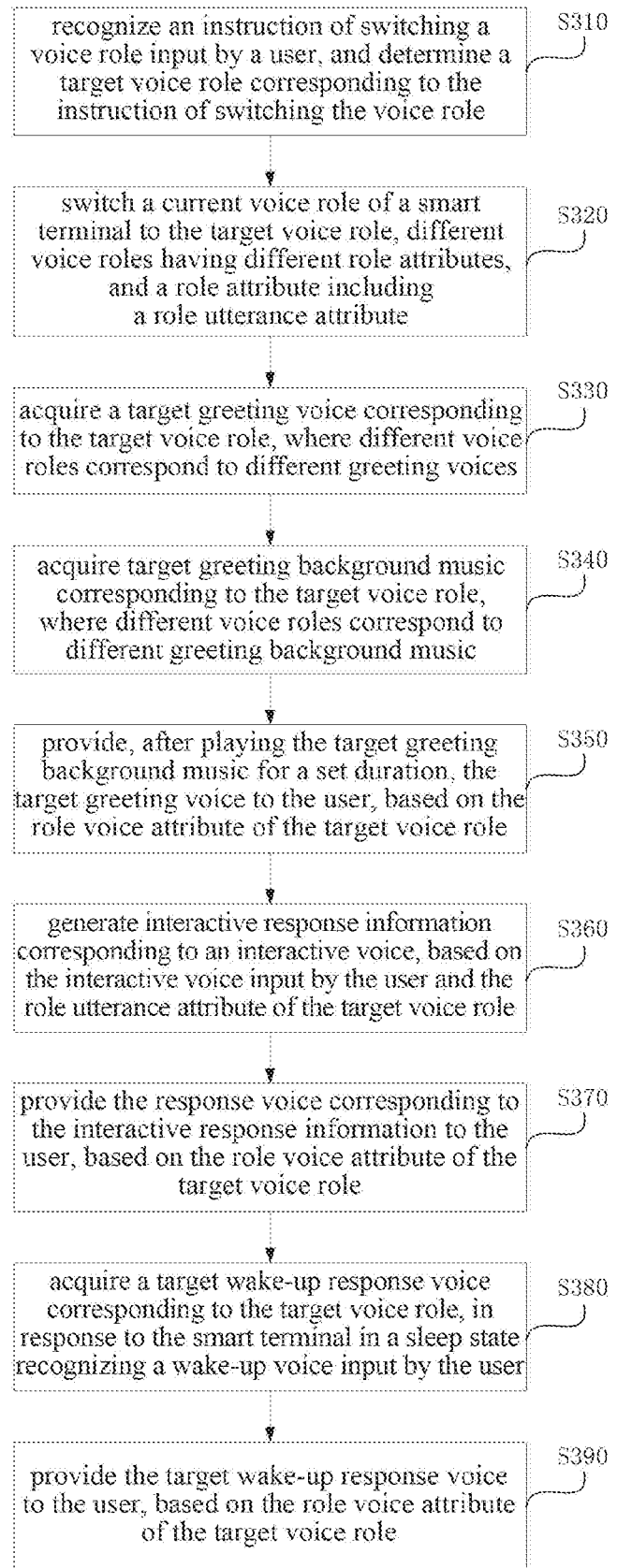
FIG. 3 is a flowchart of a method for switching a voice role according to Embodiment three of the present disclosure.

FIG. 3 is a flowchart of a method for switching a voice role provided by Embodiment three of the present disclosure. This embodiment is embodied based on the foregoing embodiments. In this embodiment, after switching a current voice role of a smart terminal to the target voice role, the method further includes: acquiring a target greeting voice corresponding to the target voice role, wherein different voice roles correspond to different greeting voices; and providing the target greeting voice to the user, based on the role voice attribute of the target voice role.

In addition, before providing the target greeting voice to the user, based on the role voice attribute of the target voice role, the method further includes: acquiring target greeting background music corresponding to the target voice role, wherein different voice roles correspond to different greeting background music;

Correspondingly, the providing the target greeting voice to the user, based on the role voice attribute of the target voice role, is specifically: providing the target greeting voice to the user, based on the role voice attribute of the target voice role, after playing the target greeting background music for a set duration.

In addition, after switching a current voice role of a smart terminal to the target voice role, the method further includes: acquiring a target wake-up response voice corresponding to the target voice role, in response to the smart terminal in a sleep state recognizing a wake-up voice input by the user, wherein different voice roles correspond to different wake-up response sounds; and providing the target wake-up response voice to the user, based on the role voice attribute of the target voice role.

Correspondingly, the method in this embodiment specifically includes:

S310, recognizing a instruction of switching a voice role input by a user, and determining a target voice role corresponding to the instruction of switching the voice role.

S320, switching a current voice role of a smart terminal to the target voice role, different voice roles having different role attributes, and the role attributes including role utterance attributes.

S330, acquiring a target greeting voice corresponding to the target voice role, wherein different voice roles correspond to different greeting voices.

In this embodiment, the inventor creatively proposes: after the user successfully switched one voice role, the target voice role will greet the user (that is, sending a target greeting voice.) The advantage of this setting is that when the voice role is switched, there is a clear change in the role sense, highlighting the differences between different voice roles, and matching the role sense of the speaker.

S340, acquiring target greeting background music corresponding to the target voice role, wherein different voice roles correspond to different greeting background music.

In order to further reflect the differences between the different voice roles, different greeting background music for different voice roles may be set when voice role is switched, allowing the user to more intuitive feel the sense of change when switching the voice role.

S350, providing the target greeting voice to the user, based on the role voice attribute of the target voice role, after playing the target greeting background music for a set duration.

Here, the set duration may be is, 2 s or 3 s, etc., which is not limited in this embodiment. It may be understood that, in addition to playing the target greeting background music first and then playing the target greeting voice, the target greeting background music may also be played simultaneously with the target greeting voice.

In an alternative implementation of the present embodiment, after the smart device switches the voice role, the current voice role will use its own unique characteristics to greet the user and introduce itself (sending the target greeting voice) with a dedicated starting music (typically may be controlled within 5 s, preferably 1-3 seconds), to realize the first meeting with the user.

TABLE 1

| switching | greeting voice | greeting background music | sequence |
|---|---|---|---|
| switching to girl next door | Hello, I am Duxiaojia | sweet style | first music, then voice |
| switching to smart AI | Hello, I am Dulante | sense of intelligent electronics | first music, then voice |
| switching to wild kid | Hello, I am wild kid | childlike and anime style | first music, then voice |

Here, an alternative music type of the greeting voice and the greeting background music corresponding to different voice roles is shown in Table 1.

S360, generating interactive response information corresponding to an interactive voice, based on the interactive voice input by the user and a role utterance attribute of the target voice role.

S370, providing the response voice corresponding to the interactive response information to the user, based on the role voice attribute of the target voice role.

S380, acquiring a target wake-up response voice corresponding to the target voice role, in response to the smart terminal in a sleep state recognizing a wake-up voice input by the user, wherein different voice roles correspond to different wake-up response sounds.

At present, after the existing smart device in the sleep state is awakened by the awakening voice, it will feedback to the user a relatively simple, a default wake-up response voice, for example, a "beep." This wake-up response voice has nothing to do with the currently used voice role, and is very mechanical and lacks a sense of conversation.

In view of this, the inventor creatively proposes to set different wake-up response voices for different voice roles to further enhance the differences between different voice roles and increase the role sense of different voice roles.

TABLE 2

| | wake-up response sound after awakened | | | |
|---|---|---|---|---|
| girl next door | Hey there | I am coming | I am here | Here I am |
| smart AI | Hello | I am here | | |
| wild kid | Master | Coming | | |

Correspondingly, different types of wake-up response voice are set up for different voice roles of different role senses. Here, an alternative wake-up response voice for different voice roles is shown in Table 2.

S390, providing the target wake-up response voice to the user, based on the role voice attribute of the target voice role.

By setting different greeting voices and greeting background music for different voice roles, the technical solution of the embodiments of the present disclosure may realize an obvious perception of role renewal after the voice role is switched, allowing the user to directly feel the change of roles. In addition, by setting different wake-up response voices for the different voice roles, it may further enhance the differences between different voice roles and increase the role sense of different voice roles, to improve the user experience with the smart device.

Embodiment Four

Figure 4:
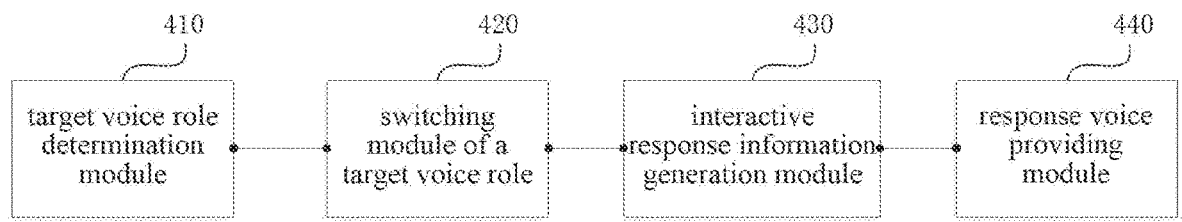
FIG. 4 is a structural diagram of an apparatus for switching a voice role according to Embodiment four of the present disclosure.

FIG. 4 is a structural diagram of an apparatus for switching a voice role provided by Embodiment four of the present disclosure. As shown in FIG. 4, the apparatus includes: a target voice role determination module 410, a switching module of a target voice role 420, an interactive response information generation module 430 and a response voice providing module 440.

The target voice role determination module 410 is configured to recognize an instruction of switching a voice role input by a user, and determine a target voice role corresponding to the instruction of switching the voice role.

The switching module of a target voice role 420 is configured to switch a current voice role of a smart terminal to the target voice role, different voice roles having different role attributes, and the role attribute including a role utterance attribute.

The interactive response information generation module 430 is configured to generate interactive response information corresponding to an interactive voice, based on the interactive voice input by the user and a role utterance attribute of the target voice role.

The response voice providing module 440 is configured to provide a response voice corresponding to the interactive response information to the user.

The embodiments of the present disclosure provide an apparatus for switching a voice role. By determining a target voice role corresponding to the instruction of switching the voice role input by the user, switching a current voice role of a smart terminal to the target voice role, generating interactive response information corresponding to an interactive voice based on the interactive voice input by the user and a role utterance attribute of the target voice role, and providing a response voice corresponding to the interactive response information to the user, the technological means enables the different voice roles to have different role utterance attributes and consistent personalities, it enables the voice role to have a role sense, and the user can feel in the conversation that the voice role is a specific person with a personality.

Based on the foregoing embodiments, the role attribute may further include: a role voice attribute.

The response voice providing module is specifically configured to: provide the response voice corresponding to the interactive response information to the user, based on the role voice attribute of the target voice role.

Based on the foregoing embodiments, the role voice attribute may include at least one of the following:

a TTS voice library, a custom timbre, a custom speech rate, or a custom volume.

Based on the foregoing embodiments, the interactive response information generation module may be specifically configured to:

recognize the interactive voice input by the user;

determine a target response type based on a recognition result, and determine target key response information matching the interactive voice;

determine a matching target response template based on the target response type and the role utterance attribute of the target voice role, wherein the target response template includes role sense background information and a blank slot for being filled with key response information; and fill the target key response information in the blank slot of the target response template to obtain the interactive response information corresponding to the interactive voice.

Based on the foregoing embodiments, the apparatus may further include a target greeting voice providing module.

The target greeting voice providing module specifically includes:

A target greeting voice acquisition unit, configured to acquire a target greeting voice corresponding to the target voice role, after a current voice role of a smart terminal is switched to the target voice role, wherein different voice roles correspond to different greeting voices; and A target greeting voice providing unit, configured to provide the target greeting voice to the user, based on the role voice attribute of the target voice role.

Based on the foregoing embodiments, the apparatus may further include a target greeting background music acquisition module, configured to: acquire target greeting background music corresponding to the target voice role, before providing the target greeting voice to the user, based on the role voice attribute of the target voice role, wherein different voice roles correspond to different greeting background music;

Correspondingly, the target greeting voice providing unit may be specifically configured to: provide, after playing the target greeting background music for a set duration, the target greeting voice to the user, based on the role voice attribute of the target voice role.

Based on the foregoing embodiments, the apparatus may further include a wake-up response module, configured to acquire, after switching a current voice role of a smart terminal to the target voice role, a target wake-up response sound corresponding to the target voice role in response to the smart terminal in a sleep state recognizing a wake-up voice input by the user, wherein different voice roles correspond to different wake-up response sounds; and provide the target wake-up response voice to the user, based on the voice attribute of the target voice role.

Based on the foregoing embodiments, the target voice role determination module is specifically configured to:

determine a unique voice role as the target voice role in response to the unique voice role is recognized based on the instruction of switching the voice role input by the user; and select the target voice role from at least two candidate voice roles using a setting filtering algorithm, in response to the at least two candidate voice roles being recognized based on the instruction of switching the voice role input by the user.

Based on the foregoing embodiments, the instruction of switching the voice role may be a voice control instruction.

The above apparatus for switching a voice role can execute the method for switching a voice role provided by any embodiment of the present disclosure, and has the corresponding functional modules and beneficial effects of performing the method for switching a voice role.

Embodiment Five

Figure 5:
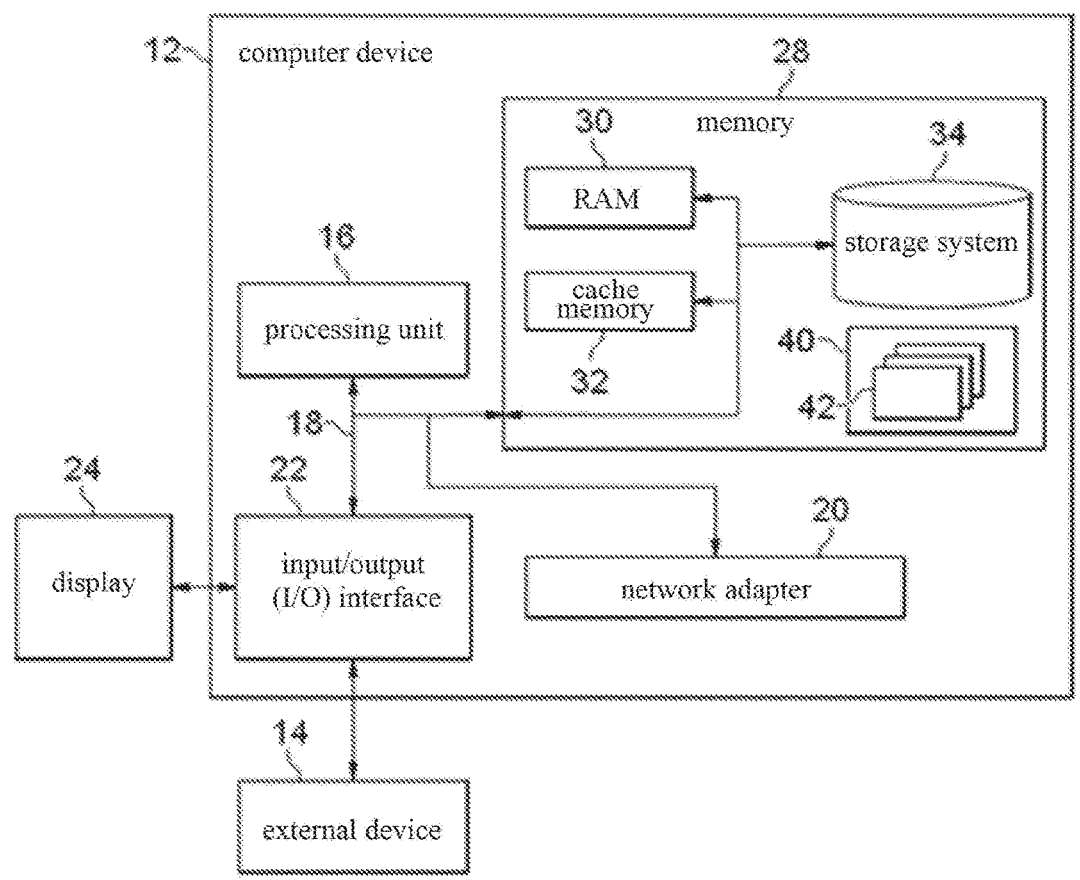
FIG. 5 is a schematic structural diagram of a computer device according to Embodiment five of the present disclosure.

FIG. 5 is a schematic structural diagram of a computer device provided by Embodiment five of the present disclosure. FIG. 5 shows a block diagram of an exemplary computer device 12 suitable for implementing embodiments of the present disclosure. The computer device 12 shown in FIG. 5 is only an example and should not impose any limitation to the function and scope of use of the embodiments of the present disclosure.

As shown in FIG. 5, the computer device 12 is represented in the form of a general-purpose computing device. The components of the computer device 12 may include, but are not limited to, one or more processors or processing units 16, a system memory 28, a bus 18 connecting different system components including the system memory 28 and the processing unit 16.

The bus 18 represents one or more of the several types of bus architectures, including a memory bus or memory controller, a peripheral bus, an accelerated graphics port, a processor, or a local bus using any of a variety of bus architectures. For example, these architectures include, but are not limited to, the Industry Standard Architecture (ISA) bus, the Micro Channel Architecture (MAC) bus, the Enhanced ISA bus, the Video Electronics Standards Association (VESA) local bus, and the Peripheral Component Interconnect (PCI) bus.

The computer device 12 typically includes a variety of computer system readable mediums. These mediums may be any available mediums that can be accessed by the computer device 12, including volatile and non-volatile mediums, removable and non-removable mediums.

The system memory 28 may include computer system readable medium in the form of volatile memory, such as a random access memory (RAM) 30 and/or a cache memory 32. The computer device 12 may further include other removable/non-removable, volatile/non-volatile computer system storage medium. By way of example only, a storage system 34 may be used to read and write non-removable, non-volatile magnetic medium (not shown in FIG. 5, commonly referred to as "hard drives"). Although not shown in FIG. 5, a disk drive for reading from and writing to a removable non-volatile disk (e.g., "floppy disk") may be provided, as well as an optical disk drive for reading from and writing to a removable non-volatile optical disk (e.g., CD-ROM, DVD-ROM, or other optical medium.) In these cases, each driver may be connected to the bus 18 via one or more data medium interfaces. The memory 28 may include at least one program product having a set (e.g., at least one) of program modules that are configured to perform the functions of the embodiments of the present disclosure.

A program/utility 40 having a set (at least one) of program modules 42 may be stored in the memory 28, for example. Such a program module 42 includes, but is not limited to, an operating system, one or more applications, other program modules and program data, each or some combination of these examples may include the implementation of a network environment. The program modules 42 generally perform the functions and/or methods of the embodiments described by the present disclosure.

The computer device 12 may also be in communication with one or more external devices 14 (e.g., a keyboard, a pointing device, a display 24, etc.), may also communicate with one or more devices that enable the user to interact with the computer device 12, and/or communicate with any device (e.g., a network card, a modem, etc.) that enable the computer device 12 to communicate with one or more other computing devices. This communication may be performed through an input/output (I/O) interface 22. In addition, the computer device 12 may also communicate with one or more networks (e.g., a local area network (LAN), a wide area network (WAN), and/or a public network, such as the Internet) via a network adapter 20. As shown in the figure, the network adapter 20 communicates with other modules of the computer device 12 via the bus 18. It should be understood that although it is not shown in FIG. 5, other hardware and/or software modules may be used in conjunction with the computer device 12, including but not limited to: microcode, device drivers, redundant processing units, external disk drive arrays, RAID systems, tapes drivers and data backup storage systems.

The processing unit 16 operates programs stored in the system memory 28 to execute various functional applications and data processing, for example, to implement the method for switching a voice role provided by the embodiments of the present disclosure.

That is, when the processing unit executes the program, it implements: recognizing an instruction of switching a voice role input by a user, and determining a target voice role corresponding to the instruction of switching the voice role; switching a current voice role of a smart terminal to the target voice role, different voice roles having different role attributes, and a role attribute including a role utterance attribute; generating interactive response information corresponding to an interactive voice, based on the interactive voice input by the user and a role utterance attribute of the target voice role; and providing a response voice corresponding to the interactive response information to the user.

Embodiment Six

Embodiment six of the present disclosure provides a computer readable storage medium, storing a computer program thereon, when the program is executed by a processor, the method for switching a voice role provided by all invention embodiments of the present disclosure is implemented:

That is, when the program is executed by the processor, it implements: recognizing an instruction of switching a voice role input by a user, and determining a target voice role corresponding to the instruction of switching the voice role; switching a current voice role of a smart terminal to the target voice role, different voice roles having different role attributes, and a role attribute including a role utterance attributes; generating interactive response information corresponding to an interactive voice, based on the interactive voice input by the user and a role utterance attribute of the target voice role; and providing a response voice corresponding to the interactive response information to the user.

Any combination of one or more computer readable medium may be employed. The computer readable medium may be a computer readable signal medium or a computer readable storage medium. The computer readable storage medium may be, for example but not limited to, an electronic, magnetic, optical, electromagnetic, infrared, or semiconductor system, apparatus, or device, or any combination of the above. More specific examples (non-exhaustive listings) of a computer readable storage medium include an electrical connection with one or more wires, a portable computer disk, a hard disk, a random access memory (RAM), a read only memory (ROM), an erasable programmable read-only memory (EPROM or flash memory), an optical fiber, a portable compact disk read-only memory (CD-ROM), an optical storage device, a magnetic storage device, or any suitable combination of the above. In this document, a computer readable storage medium may be any tangible medium that contains or stores a program for use by or in connection with an instruction execution system, apparatus, or device.

A computer readable signal medium may include a data signal carrying computer readable program codes that propagates in baseband or as part of a carrier wave. Such propagated data signals may take a variety of forms including, but not limited to, electromagnetic signals, optical signals, or any suitable combination of the above. The computer readable signal medium may also be any computer readable medium other than the computer readable storage medium, and the computer readable medium may send, propagate, or transmit a program for being used by or in connection with an instruction execution system, apparatus, or device.

Program codes included in a computer readable medium may be transmitted using any suitable medium, including but not limited to wireless, wire, optical fiber cable, RF, etc., or any suitable combination of the above.

Computer program codes for executing operations of the present disclosure may be written in one or more programming languages, or a combination thereof, the one or more programming languages including object-oriented programming languages such as Java, Smalltalk, C++, as well as conventional procedural programming languages such as "C" language or similar programming languages. The program codes may be executed entirely on the user's computer, partly on the user's computer, as a stand-alone software package, partly on the user's computer and partly on a remote computer, or entirely on a remote computer or server. In the case of a remote computer, the remote computer may be connected to the user's computer through any kind of network including a local area network (LAN) or a wide area network (WAN), or may be connected to an external computer (for example, connect via the internet using an internet service provider.)

It is to be noted that the foregoing embodiments are merely preferred embodiments of the present disclosure, and the technical principles used thereby. Persons skilled in the art may understand that the present disclosure is not limited to the specific embodiments described herein. Persons skilled in the art may make various obvious changes, readjustments and substitutions without departing from the protection scope of the present disclosure. Therefore, although reference is made to the present disclosure in more detail in the foregoing embodiments, the present disclosure is not merely limited to the foregoing embodiments, more additional equivalent embodiments may be further included without departing from the conception of the present disclosure. The scope of the present disclosure is determined by the scope of the appended claims.

What is claimed is:

1. A method for switching a voice role, the method comprising:
   recognizing an instruction of switching a voice role input by a user, and determining a target voice role corresponding to the instruction of switching the voice role, comprising: in response to at least two candidate voice roles corresponding to the instruction input by the user being recognized, selecting one from the at least two candidate voice roles as the target voice role using a setting filtering algorithm;
   switching a current voice role of a smart terminal to the target voice role, different voice roles having different role attributes, a role attribute comprising a role utterance attribute and a role voice attribute, wherein the role utterance attribute refers to a linguistic expression mode used to reflect a character trait and is reflected through a plurality of response templates;
   generating interactive response information corresponding to an interactive voice, based on the interactive voice input by the user and a role utterance attribute of the target voice role, wherein for different role voice attributes, different response templates are selected to generate the interactive response information responding to the interactive voice input by the user, wherein the generating the interactive response information corresponding to the interactive voice comprises:
      recognizing the interactive voice input by the user, to obtain a recognition result;
      determining a target response type based on the recognition result, and determining target key response information matching the interactive voice, wherein the target response type comprises one of: play music and gourmet search;

determining a matching target response template based on the target response type and the role utterance attribute of the target voice role, wherein the target response template comprises role sense background information and a blank slot for being filled with key response information; and filling the target key response information in the blank slot of the target response template to obtain the interactive response information corresponding to the interactive voice; and providing a response voice corresponding to the interactive response information to the user.

2. The method according to claim 1, wherein
the providing a response voice corresponding to the interactive response information to the user comprises:
providing the response voice corresponding to the interactive response information to the user, based on a role voice attribute of the target voice role.

3. The method according to claim 2, wherein the role voice attribute comprises at least one of the following:
a TTS voice library, a custom timbre, a custom speech rate, or a custom volume.

4. The method according to claim 2, wherein, after the switching a current voice role of a smart terminal to the target voice role, the method further comprising:
acquiring a target greeting voice corresponding to the target voice role, wherein different voice roles correspond to different greeting voices; and
providing the target greeting voice to the user, based on the role voice attribute of the target voice role.

5. The method according to claim 4, wherein, before the providing the target greeting voice to the user, based on the role voice attribute of the target voice role, the method further comprising:
acquiring target greeting background music corresponding to the target voice role, wherein different voice roles correspond to different types of greeting background music; and
the providing the target greeting voice to the user, based on the role voice attribute of the target voice role, comprising:
providing the target greeting voice to the user based on the role voice attribute of the target voice role, after playing the target greeting background music for a set duration.

6. The method according to claim 2, wherein, after the switching a current voice role of a smart terminal to the target voice role, the method further comprising:
acquiring a target wake-up response voice corresponding to the target voice role, in response to the smart terminal in a sleep state recognizing a wake-up voice input by the user, wherein different voice roles correspond to different wake-up response sounds; and
providing the target wake-up response voice to the user, based on the role voice attribute of the target voice role.

7. The method according to claim 1, wherein the recognizing an instruction of switching a voice role input by a user, and determining a target voice role corresponding to the instruction of switching the voice role comprises:
defining, in response to a unique voice role being recognized based on the instruction of switching the voice role input by the user, the unique voice role as the target voice role; and
selecting, in response to at least two candidate voice roles being recognized based on the instruction of switching the voice role input by the user, the target voice role from the at least two candidate voice roles using a setting filtering algorithm.

8. The method according to claim 1, wherein the instruction of switching the voice role is a voice control instruction.

9. An apparatus for switching a voice role, the apparatus comprising:
at least one processor; and
a memory storing instructions, the instructions when executed by the at least one processor, cause the at least one processor to perform operations, the operations comprising:
recognizing an instruction of switching a voice role input by a user, and determining a target voice role corresponding to the instruction of switching the voice role, comprising: in response to at least two candidate voice roles corresponding to the instruction input by the user being recognized, selecting one from the at least two candidate voice roles as the target voice role using a setting filtering algorithm;
switching a current voice role of a smart terminal to the target voice role, different voice roles having different role attributes, a role attribute comprising a role utterance attribute and a role voice attribute, wherein the role utterance attribute refers to a linguistic expression mode used to reflect a character trait and is reflected through a plurality of response templates;
generating interactive response information corresponding to an interactive voice, based on the interactive voice input by the user and a role utterance attribute of the target voice role, wherein for different role voice attributes, different response templates are selected to generate the interactive response information responding to the interactive voice input by the user, wherein the generating the interactive response information corresponding to the interactive voice comprises:
recognizing the interactive voice input by the user, to obtain a recognition result;
determining a target response type based on the recognition result, and determining target key response information matching the interactive voice, wherein the target response type comprises one of: play music and gourmet search;
determining a matching target response template based on the target response type and the role utterance attribute of the target voice role, wherein the target response template comprises role sense background information and a blank slot for being filled with key response information; and
filling the target key response information in the blank slot of the target response template to obtain the interactive response information corresponding to the interactive voice; and
providing a response voice corresponding to the interactive response information to the user.

10. A non-transitory computer readable storage medium storing a computer program, wherein the computer program, when executed by a processor, cause the processor to perform operations, the operation comprising:
recognizing an instruction of switching a voice role input by a user, and determining a target voice role corresponding to the instruction of switching the voice role, comprising: in response to at least two candidate voice roles corresponding to the instruction input by the user being recognized, selecting one from the at least two candidate voice roles as the target voice role using a setting filtering algorithm;

switching a current voice role of a smart terminal to the target voice role, different voice roles having different role attributes, a role attribute comprising a role utterance attribute and a role voice attribute, wherein the role utterance attribute refers to a linguistic expression mode used to reflect a character trait and is reflected through a plurality of response templates;

generating interactive response information corresponding to an interactive voice, based on the interactive voice input by the user and a role utterance attribute of the target voice role, wherein for different role voice attributes, different response templates are selected to generate the interactive response information responding to the interactive voice input by the user, wherein the generating the interactive response information corresponding to the interactive voice comprises:

recognizing the interactive voice input by the user, to obtain a recognition result;

determining a target response type based on the recognition result, and determining target key response information matching the interactive voice, wherein the target response type comprises one of: play music and gourmet search;

determining a matching target response template based on the target response type and the role utterance attribute of the target voice role, wherein the target response template comprises role sense background information and a blank slot for being filled with key response information; and filling the target key response information in the blank slot of the target response template to obtain the interactive response information corresponding to the interactive voice; and providing a response voice corresponding to the interactive response information to the user.

11. The method according to claim 1, wherein the selecting one from the at least two candidate voice roles as the target voice role using the setting filtering algorithm, comprises:

selecting the voice role having a highest historical frequency of use from the at least two candidate voice roles as the target voice role.

12. The method according to claim 1, wherein the different role voice attributes for the different voice roles are set and customized by the user.

13. The method according to claim 1, wherein the role utterance and role voice parameters corresponding to different voice roles are stored in different storage spaces, wherein the method further comprises:

in response to switching to the determined target voice role, loading the role utterance and the role voice parameters of the target voice role into memory.

14. The method according to claim 1, wherein the determining the target response type comprises:

inputting the interactive voice input by the user into a pre-trained response type classification model to determine a corresponding target response type as the target response type.

15. The method according to claim 5, wherein the set duration is within 1 second to 3 seconds.

* * * * *